Figure 1:
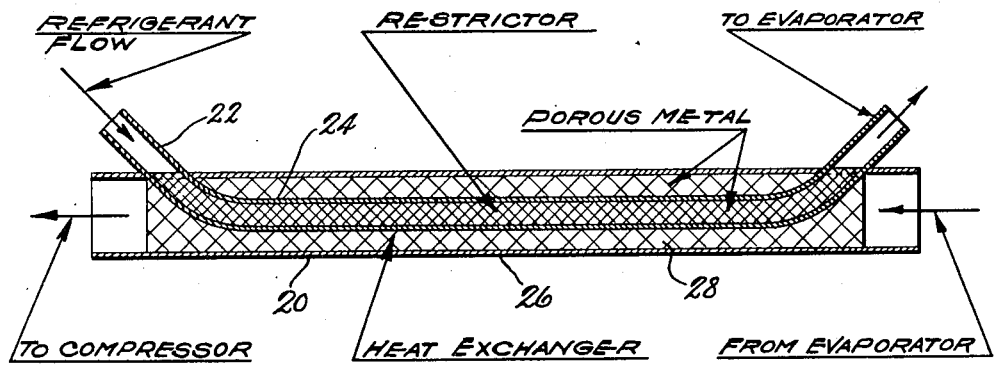

INVENTOR
THEODORE W. KUNZOG
BY
ATTORNEY

Patented Aug. 31, 1948

2,448,315

UNITED STATES PATENT OFFICE 2,448,315

COMBINATION RESTRICTOR AND HEAT EXCHANGER

Theodore W. Kunzog, Dayton, Ohio, assignor to General Motors Corporation, Detroit, Mich., a corporation of Delaware Application February 14, 1945, Serial No. 577,919

2 Claims. (Cl. 257—246)

This invention relates to a restrictor and is particularly concerned with a combination restrictor and heat exchanger for improving the efficiency of such systems.

The main object of the invention is to provide a combined restrictor and heat exchanger therefor wherein the exchanger and restrictor are built as a unit whereby the efficiency is markedly increased. In carrying out the above object, it is a further object to provide a restrictor made from sintered non-compacted metal powder for providing a multiplicity of tortuous inter-connecting capillary sized passages, said restrictor being metallurgically bonded to an outer casing through the medium of additional sintered non-compacted metal powder there-around. In use the flow through the exchanger is preferably opposite in direction to the flow through the restrictor and the porosity of the porous metal in the heat exchanger portion of the unit is preferably greater than the porosity of the material in the restrictor.

A still further object is to provide a refrigerant restrictor consisting of a highly porous metal metering device which is contained within a casing and spaced from a second casing through the medium of highly porous metal bonded to both casings wherein the highly porous metal used as a spacing means likewise acts as a large surface area heat exchange wherein refrigerant may be flowed counter-current to the refrigerant in the restrictor for cooling said refrigerant and thereby increasing the efficiency of the unit.

Further objects and advantages of the present invention will be apparent from the following description, reference being had to the accompanying drawings wherein preferred embodiments of the present invention are clearly shown.

Figure 2:
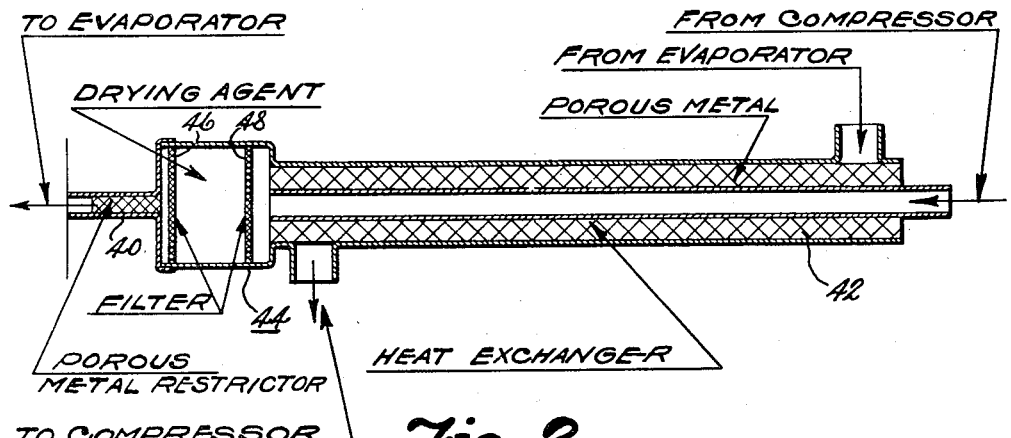

In the drawings:

Fig. 1 represents a view in cross-section of one type of restrictor and heat exchanger, and, Fig. 2 is a drawing showing a modification of the device shown in Fig. 1, wherein a filter unit is provided before the restrictor, which filter unit may likewise act as a drying compartment when dehydration of the fluid passing through the restrictor is desired.

In my copending application S. N. 530,435, of which the present application is a continuation-in-part, I have disclosed a porous metal restrictor for use in a refrigeration system wherein, due to the tremendous number of capillary passages through the restrictor, there is small possibility of clogging of the restrictor. This may be explained by the fact that highly porous metal made from sintered non-compacted metal powder provides a multiplicity of pores of tortuous shape, which pores are interconnecting in nature whereby when the entry to one of the pores is closed, the tortuous passage is still maintained in use due to its interconnection with another of the surface entries. In this manner, the surface of the restrictor adjacent the incoming fluid acts in a measure as a filter whereby the restrictor remains open even when foreign matter collects at the incoming side thereof.

The present invention is directed to a restrictor wherein a heat exchanger is made integral therewith so that the efficiency of the over-all unit in a refrigeration system is markedly increased. In refrigeration, the refrigerant fluid is compressed, cooled and then run through a restrictor whereby the fluid, which is under high pressure at the inlet side thereof is reduced in pressure and permitted to expand thereby creating a lowering of the temperature at the outlet side of the restrictor which is connected to an evaporator. This lowering of temperature cools the evaporator which is positioned within the refrigerator. As additional fluid is passed into the evaporator, the gaseous medium therein is forced outwardly and back to the compressor where it is compressed for another cycle of operation.

In most refrigeration systems the condenser or cooling unit positioned on the outlet side of the compressor, merely consists of a radiator type of cooling unit which is cooled by air from a fan operated by the motor used on the compressor. It is apparent, therefore, that the efficiency of cooling is not very great and that the fluid in compressed state which is supplied to the restrictor is generally at a temperature above room temperature which, upon expansion, raises the final temperature of the expanded fluid. It is manifest that if the temperature of the fluid going into the restrictor could be lowered, that the temperature of the expanded fluid at the outlet side of the restrictor would likewise be lowered.

To this end, I propose to utilize a heat exchanger in connection with the restrictor. This unit is shown at 20 in Fig. 1. The restrictor in this case is merely a copper tube 22, having sintered non-compacted metal powder 24 within, which porous metal is bonded to the walls of the tube thereby forming a good heat conducting path thereto. The tube 24 is positioned within a larger tube or container 26 and is held spaced from the walls thereof through the medium of porous metal 28 made from sintered non-compacted metal powder. The metal powder is metallurgically bonded to both tubes thereby providing an excellent heat conducting path. It is likewise preferable, although not entirely essential, to have the porosity of the porous metal in the heat exchanger greater than the porosity of the porous metal in the restrictor. This may be accomplished by utilizing different grain size powders in the manufacture thereof. To this end, for example, if a 200 plus mesh powder is used in the restrictor, 100 to 150 plus mesh powder is used in the manufacture of the exchanger, etc. The exchanger is positioned in the return line from the evaporator whereby the cold refrigerant upon passing from the evaporator flows through the heat exchanger and then back through the compressor. In so doing, the cold refrigerant contacts the warmer compressed fluid coming from the compressor through the condenser, etc. Thus, through the excellent heat conduction created by the metallurgical bond between the various parts of the apparatus, the fluid in the restrictor is lowered in temperature and upon expansion thereof, is obviously at a lower temperature than would be possible had the fluid not been cooled. In this manner, the efficiency of the system is markedly increased.

Fig. 2 shows a modification of the design wherein the restrictor is shown at 40 and heat exchanger at 42, therebetween is a filter unit 44 including two porous metal plates 46 and 48 made from sintered non-compacted metal powder to protect the restrictor from any possible foreign matter which may be passing through the line. In some cases, it may be desirable to include a de-hydrating or drying agent between these two plates whereby any moisture in the system can be eliminated. Obviously, once this moisture is eliminated the de-hydrating agent is of no future use. However, it is often difficult to remove the last traces of moisture from the refrigerant and by including a de-hydrating agent directly in the system, this may be accomplished in a more facile manner.

It should be understood that the success of the unit is primarily due to the excellent heat conducting qualities of the apparatus. The restrictor is preferably porous metal formed from bronze or copper-nickel alloy. The containing tube between the restrictor and the heat exchanger is preferably copper or bronze and the heat exchanger porous metal is preferably similar to that used in the restrictor. Obviously other porous metals can be used, if desired, but are generally not as suitable since the heat conducting qualities of copper or highly copper alloys are greater than for most other commercial metals.

The Olt patent, 2,273,589, and the Koehring Patent No. 2,198,253 mentioned therein both of which are assigned to the assignee of the present invention show various procedures for sintering metal powder and likewise suggest various combinations of metals which may be satisfactorily utilized under varying conditions.

In all cases it is apparent that the porous metal of the restrictor is for all intents and purposes a continuation of the porous metal in the exchanger. This provides for excellent heat conduction not possible by other means. Then too, the porous metal presents extremely large surface areas for conduction which increases the efficiency of the unit over conventional exchangers that utilize conducting fins and the like.

It is understood, that while this invention is described in connection with refrigeration systems where such a unit will be desirable, however, this unit is not limited in use to refrigeration systems but may be used in any application where a restrictor and heat exchanger are necessary or desirable.

While the embodiments of the present invention as herein disclosed, constitute preferred forms, it is to be understood that other forms might be adopted, all coming within the scope of the claims which follow.

What is claimed is as follows:

1. A combined restrictor and heat exchanger comprising a unitary structure including two concentric tubes, the inner of said tubes being filled with highly porous metal made from sintered non-compacted metal powder, predominating in copper, said tube being held spaced from and bonded to said second tube through the medium of highly porous metal filling the space therebetween and made from non-compacted highly porous metal powder wherein the pore size of the last mentioned porous metal is greater than the pore size of the first mentioned porous metal.

2. A heat exchanger and restrictor for use in a refrigeration system, comprising in combination; a restrictor consisting of an elongated tube containing highly porous metal powder made from sintered non-compacted metal powder wherein the porous metal is bonded to the walls of said tube, said restrictor being contained within a casing and metallurgically bonded to the walls thereof, said tube being spaced within said casing by highly porous metal of a different porosity than said first mentioned porous metal, said second mentioned porous metal being bonded to the walls of the casing to the walls of said tube whereby fluid flowing through said porous metal in the outer casing cools the fluid flowing through the porous metal in the tube through heat conduction through porous metal and said tube.

THEODORE W. KUNZOG.

REFERENCES CITED

The following references are of record in the file of this patent:

UNITED STATES PATENTS

| Number | Name | Date |
|---|---|---|
| 1,880,533 | Thomas | Oct. 4, 1932 |
| 1,893,330 | Jones | Jan. 3, 1933 |
| 2,120,764 | Newton | June 14, 1938 |

FOREIGN PATENTS

| Number | Country | Date |
|---|---|---|
| 509,105 | Great Britain | July 11, 1939 |
| 147,858 | Germany | Feb. 1, 1904 |